(12) United States Patent
Deshpande

(10) Patent No.: US 6,731,605 B1
(45) Date of Patent: May 4, 2004

(54) PRIORITIZED OPTIMAL SERVER SIDE BANDWIDTH ALLOCATION IN A MULTIMEDIA SESSION WITH PUSH AND PULL SOURCES

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 890 days.

(21) Appl. No.: 09/596,515

(22) Filed: Jun. 19, 2000

(51) Int. Cl.$^7$ .............................. G01R 31/08; H04J 3/16; H04J 3/06
(52) U.S. Cl. ....................... 370/252; 370/468; 370/519; 375/240; 709/240
(58) Field of Search ................................ 370/252, 468, 370/477, 466, 519; 709/230, 231, 233, 240, 320; 375/225, 240

(56) References Cited

U.S. PATENT DOCUMENTS

| | | |
|---|---|---|
| 5,506,844 A | 4/1996 | Rao |
| 5,708,664 A | 1/1998 | Budge et al. |
| 5,793,425 A | 8/1998 | Balakrishnan |
| 5,802,106 A | 9/1998 | Packer |
| 5,815,503 A | 9/1998 | Li |
| 5,854,658 A | 12/1998 | Uz et al. |
| 5,861,919 A | 1/1999 | Perkins et al. |
| 5,862,140 A | 1/1999 | Shen et al. |
| 5,877,812 A | 3/1999 | Krause et al. |
| 5,923,655 A | 7/1999 | Veschi et al. |
| 5,928,331 A * | 7/1999 | Bushmitch .................. 709/231 |
| 5,956,088 A | 9/1999 | Shen et al. |
| 5,966,120 A | 10/1999 | Arazi et al. |
| 6,005,620 A | 12/1999 | Yang et al. |
| 6,011,590 A | 1/2000 | Saukkonen |
| 6,023,456 A | 2/2000 | Chapman et al. |
| 6,389,068 B1 * | 5/2002 | Smith et al. ................ 375/225 |

OTHER PUBLICATIONS

Tao, Bo et al., "A Rate–Quantization Model for MPEG Encoders," ICIP, Jul., 1997, pp. 338–341, IEEE, USA.
Choi, Chun–Hung et al., "Fast Piecewise Linear Approximation of Rate–Distortion Functions For MPEG Video," SPIE, 1997, vol. 3024, pp. 1382–1393.
Lee, Myeong–Jin et al., "A Scene Adaptive Bitrate Control Method in MPEG Video Coding," SPIE, 1997, vol. 3024, pp. 1406–1416.
Riba–Corbera, Jordi, "Rate Control in DCT Video Coding for Low Delay Communications," IEEE Transactions on Circuits and Systems for Video Technology, Feb., 1999, vol. 9, No. 1, pp. 172–185, IEEE.
Reibman, Amy, "Constraints on Variable Bit–Rate Video for ATM Networks," IEEE Transactions on Circuits and Systems for Video Technology, Dec., 1992, vol. 2, No. 4, pp. 361–372, IEEE.
Keesman, Gertjan, et al., "Analysis of Joint Bit–Rate Control in Multi–Program Image Coding," SPIE, vol. 2308, 1994, pp. 1906–1917.
Balakrishnan, Mahesh et al., "Global Optimization of Multiplexed Video Encoders," ICIP, 1997, pp. 377–380, IEEE.
ITU –T/SG16, Video Codec Test Model, Near–Term, Version 10 (TMN10) Draft 1, ITU–Telecommunications Standardization Sector, Apr., 1998.

* cited by examiner

Primary Examiner—Duc Ho
(74) Attorney, Agent, or Firm—Chernoff Vilhauer McClung & Stenzel, LLP

(57) ABSTRACT

In a computer network, the bandwidth of the communication channel connecting nodes of the network is limited. A cost function is used to allocate the bandwidth of the channel among the data for a plurality of elements in a multimedia session. The cost function relates the distortion produced by a change in encoding rate for one or more media with a delay in transferring data related to another medium at a particular rate. A fairness criterion, expressing the relative weighting of the distorted and delayed elements for specific applications, can be included in the cost function. The cost function can be used to allocate the bandwidth between media from both push and pull sources.

16 Claims, 2 Drawing Sheets

| MEDIA | CHARACTERISTICS | PRIORITY |
|---|---|---|
| AUDIO | • STREAM - PUSH (RTP/UDP)<br>• DELIVERY - UNRELIABLE<br>• PRESENTATION - CONTINUOUS<br>• TYPICALLY ENCODED AT SELECTED, FIXED RATES | HIGH |
| VIDEO | • STREAM - PUSH (RTP/UDP)<br>• DELIVERY - UNRELIABLE<br>• PRESENTATION - CONTINUOUS<br>• TYPICALLY ENCODED WITH A RATE CONTROL ALGORITHM AT ANY RATE WITHIN A RANGE | LOW |
| IMAGE | • STREAM - PULL (HTTP/TCP/IP)<br>• DELIVERY - RELIABLE<br>• PRESENTATION - DISCONTINUOUS<br>• TYPICALLY CAN PULL AT AVAILABLE BANDWIDTH | HIGH |
| TEXT | • STREAM - PULL (HTTP/TCP/IP)<br>• DELIVERY - RELIABLE<br>• PRESENTATION - DISCONTINUOUS<br>• TYPICALLY VERY LOW BANDWIDTH REQUIRED | HIGH |
| DATA | • STREAM - PULL (HTTP/TCP/IP) OR PUSH (RTP)<br>• DELIVERY - RELIABLE<br>• PRESENTATION - CONTINUOUS OR DISCONTINUOUS | HIGH |

PRIORITIZED OPTIMAL SERVER SIDE BANDWIDTH ALLOCATION IN A MULTIMEDIA SESSION WITH PUSH AND PULL SOURCES

BACKGROUND OF THE INVENTION

The present invention relates to computer networks and, more particularly, to a method of allocating network bandwidth during a multimedia session that includes both push and pull data sources.

A multimedia network session may include audio, video, image, and data elements. For example, in a distance learning production an instructor may deliver a video lecture accompanied by slides or whiteboard illustrations. The image of the instructor is delivered over the network by a video medium and the sound by an audio medium. The whiteboard illustrations and slides may be delivered to viewers as images. Other elements of the lecture, such as an outline or prepared notes, might be delivered as text. Typically, a server program streams or transmits the data representing the multimedia presentation elements to client programs running on the several computers or other devices which the students use to view the lecture. Each medium or program element has its own nature and characteristics and different protocols are used in transmitting each element of the session over the network. For example in a multimedia session such as the exemplary lecture, the server may control the flow and rate of data transmission or "push" data representing certain elements of the session to the clients. On the other hand, some of the data may be "pulled" from the server with the client controlling the data rate. The data representing some of the elements of the lecture may be transferred at fixed rates while data representing other elements may be transferred at variable rates. The bandwidth available for the session is limited, usually by the client's connection. When the bandwidth is limited, a method of allocating the available bandwidth to most effectively transport the dynamically varying data rates for the media is desired.

Statistical multiplexing has been investigated for use in bandwidth allocation between a plurality of video encoders. Uz et al., U.S. Pat. No. 5,854,658, describe a statistical multiplexing system for rate control for a plurality of video encoders. The rate control system is intended to maximize the perceived quality of the decoded video which is related to the coding rate. Allocation of coding rates between the several encoders is accomplished by minimization of a cost function that seeks to minimize either the total distortion or the maximum distortion of the video. An encoder reports its status to the central controller after encoding each video frame. The report includes upper and lower rate limits that will avoid an exception for the encoder's video buffer verifier. The central controller computes the desired rate allocation without consideration of buffer constraints and clamps each encoder's rate at a rate between the upper and lower rates reported by the encoder. As the demands of the system and the limits of the rate ranges for the various encoders change, the portion of the total bandwidth allocated to each encoder changes. Statistical multiplexing is useful for controlling a plurality of video encoders undertaking a common task in a manner common to all the encoders. However, statistical multiplexing does not provide a mechanism suitable for bandwidth allocation for a number of disparate elements from push and pull sources that are transferred using several different protocols.

What is desired, therefore, is a method of allocating the limited bandwidth of a network communication channel among several disparate media having differing characteristics, being communicated with several protocols, and having data transfer rates controlled by a combination of push and pull sources.

SUMMARY OF THE INVENTION

The present invention overcomes the aforementioned drawbacks of the prior art by providing a method of transferring data comprising the steps of transferring data for a first medium at a first rate and transferring data for a second medium at a second rate, the second rate determined by a function relating a distortion of the first medium and a latency in transferring the second medium data. The function relating the distortion of the first medium and the delay for the second medium is a cost function. A data transfer rate for the second medium that minimizes the cost function optimizes the conflicting goals of minimizing the distortion of the first medium which is often video provided by unreliable delivery and the delay of the second medium which can be text, data or an image provided with reliable delivery. The cost function can also include a value expressing a relative weighting of the delay of the second medium and the distortion in the first medium.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

A computer network comprises a collection of systems or nodes connected by a communication channel over which information is transferred between end systems. End systems are the devices that permit users to remotely access information over the network. Network applications are typically designed so that one computer or end system acts as a server managing network traffic and providing services and data to other end systems or clients attached to the network. On the other hand, network applications can provide for peer-to-peer operation where end systems may alternately assume the roles of client or server from time to time. In either event, the end systems may establish a connection for data transfer by way of a communication channel that has a limited data carrying capacity or bandwidth.

Figure 1:
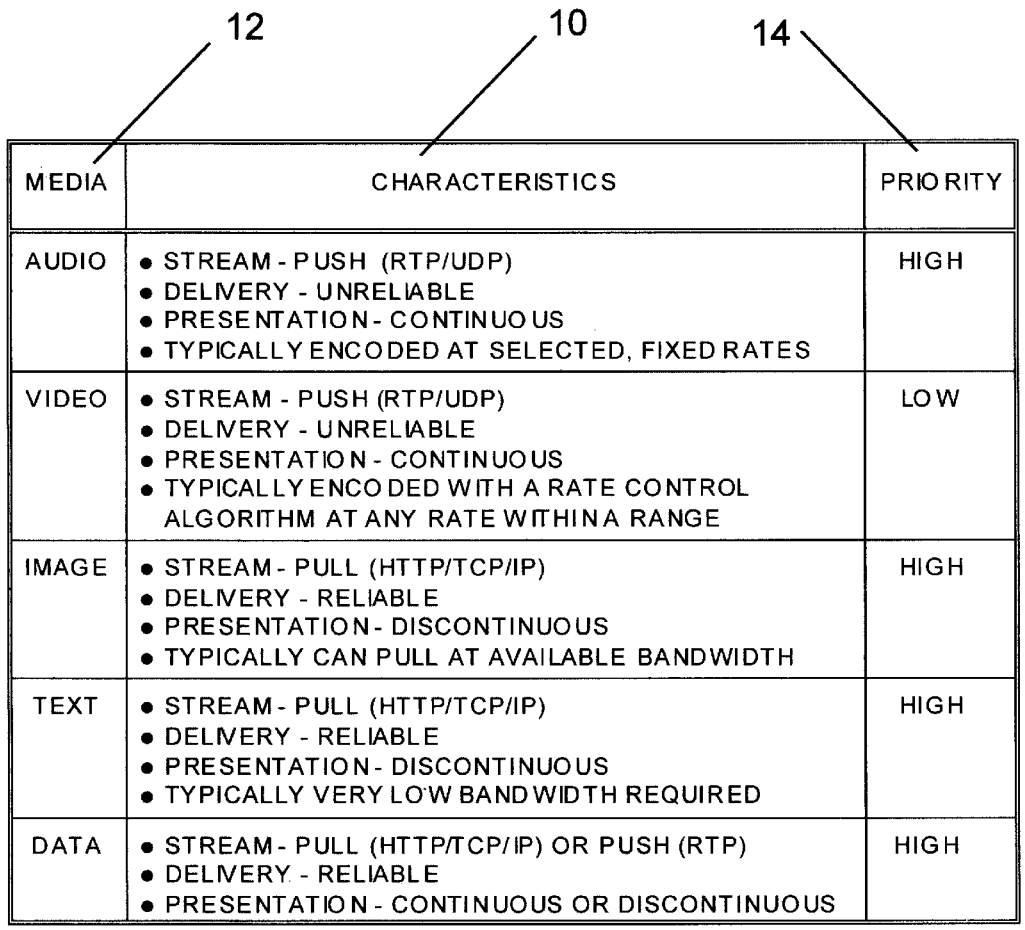
FIG. 1 is a table of characteristics of exemplary media of a multimedia network session.

A network session may require transferring data related to a number of elements or media. For example, a lecture delivered as part of a distance learning activity may involve video, audio, image, data, and text elements. FIG. 1 lists certain exemplary characteristics 10 of several media 12 or elements that might be included in a typical multimedia network session and the communication processes used to transfer medium related data over a computer network during a session. For example, video and audio are typically transferred in a data stream "pushed" by the server while images and text are typically "pulled" by the client. The server controls the flow and rate of data transfer for data in a push stream. Push protocols include Real-time Transport Protocol (RTP) for streaming media and SGI (Silicon Graphics Inc.) MediaBase for video on demand. On the other hand, the client controls the data transfer rate for a pull stream by invoking a protocol such as Hypertext Transfer Protocol (HTTP) which is used for transferring images, text, and, in some cases, data.

In addition to differences in the identity of the controlling entity for the transfer, some media may be continuously presented while other elements of the session are presented discontinuously in discrete units. For example, video and audio elements of a session must be presented continuously to provide acceptable communication. On the other hand, images are discrete elements that are presented only "occasionally." The exemplary lecture may include slides delivered as images at appropriate points in the lecture. SMIL (Synchronized Multimedia Integration Language) may be used to communicate the temporal relationships and natures of the various media to the client.

The nature of the medium and its presentation characteristics influence whether the data transfer protocol provides for reliable delivery. Reliable delivery implies that packets of data will be transmitted in the original order and that data will not be lost or duplicated. The Transmission Control Protocol (TCP) is a connection oriented protocol providing reliable delivery. TCP/IP, TCP running on top of Internet Protocol (IP), is used in connection with the transfer of images and text and, occasionally, data. In contrast, the User Datagram Protocol (UDP) is a transport layer protocol for use with the Internet Protocol (IP) network layer that provides best effort or unreliable delivery to an end system. UDP runs on top of IP (Internet Protocol) networks and provides a direct method of sending and receiving datagrams over an IP network. UDP provides few error recovery services and no guarantee of delivery or protection from duplication. UDP is used with audio and video transfers where minimal overhead is important but attempts to correct errors or retransmit the data would, in all likelihood, result in untimely delivery of the data.

The delivery mechanisms for the various media reflect the requirements of the media and set limits on effective bandwidth allocation. Audio encoders typically encode at one or more fixed rates. For example, the dual rate speech encoder of the ITU-T Rec. G.723.1 (03/96) DUAL RATE SPEECH CODER FOR MULTIMEDIA COMMUNICATIONS TRANSMITTING AT 5.3 AND 6.3 KBIT/S, International Telecommunications Union, 1996, can encode audio at a fixed rate of either 5.3 or 6.3 Kilobits per second. Video encoders such as the H.263+encoder for ITU-T RECOMMENDATION H.263, VIDEO CODING FOR LOW BIT RATE COMMUNICATION, International Telecommunications Union, February 1998, are typically capable of encoding at any rate within a range established by the encoder's rate control algorithm. As indicated in FIG. 1, images are typically transmitted at a rate determined by the available bandwidth. When an image is transferred there is a delay or latency before the image is available for display by the client. If video or audio is encoded at a lower rate during this interval of delay, the image can be transmitted faster. In addition, in some applications certain media 12 may have a higher priority 14 than others.

Figure 2:
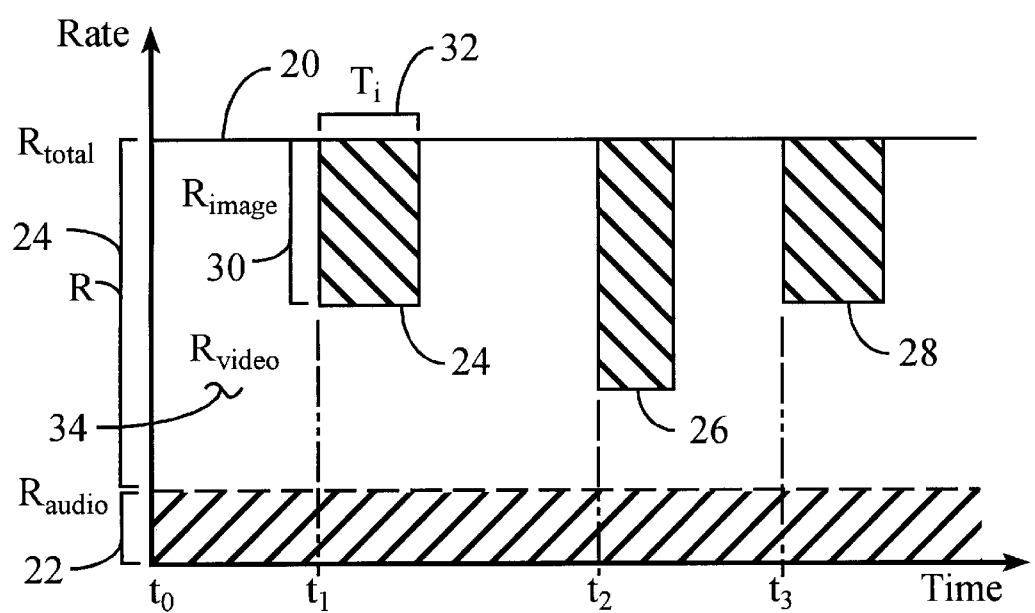
FIG. 2 is a graph of an exemplary dynamic allocation of communication channel bandwidth among data for a plurality of media.

The communication channel of a network has a limited bandwidth which is often established by the client's connection. For example, a client might be connected to the network through a 56-Kbps modem dial-up connection or the client might be connected through a high speed local area network (LAN). The nature of the bandwidth limitation may also determine whether the total bandwidth is fixed throughout the session or variable with time. FIG. 2 illustrates allocation of the bandwidth of a network having a fixed total data rate ($R_{total}$) 20 for a multimedia session. The total data rate 20 is to be allocated among data for each of three elements. The audio element is pushed at a constant rate ($R_{audio}$) 22 (indicated by a bracket). Since the audio rate ($R_{audio}$) 22 is fixed in the example of FIG. 2, the bandwidth available for allocation between the remaining media (R) 24 (indicated by a bracket) is:

$$R=R_{total}-R_{audio}$$

At times $t_1$, $t_2$, and $t_3$ the transmissions of images 24, 26, and 28 are initiated. The data rate for image transmission ($R_{image}$) 30 (indicated by a bracket) may differ for the various images and, as a result, the image transmission time or latency ($T_i$) 32 may also vary. If the image comprises $n_i$ bits, the time required to transmit the image $T_i=n_i/R_{image}$. While the time intervals between transmissions of images may also vary, it is assumed that the transmission of an earlier image is completed before it is time to transfer the next image.

Video encoders provide for variable encoding rates and video can be pushed at a data rate ($R_{video}$) 34 sufficient to utilize the allocable data rate 24. Rate control for video encoders is typically accomplished by increasing the quantizer scale as the bit rate of the encoder decreases. Increasing the quantizer scale or compression ratio results in greater differences between the values of compressed pixels and their uncompressed counterparts or greater video distortion. Video distortion can contort images, produce a blocky appearance, reduce contrast, produce erroneous colors or snow and otherwise degrade the quality of the video. The video distortion(D) of a video encoder can be expressed by a number known video distortion metrics, including mean square error (MSE), sum of absolute differences (SAD), and peak signal to noise ratio (PSNR). The video distortion (D) produced by the video encoder used in the exemplary multi-media session illustrated in FIG. 2 is a function of the video data rate ($R_{video}$) 34. During periods when an image is not being transmitted, the video date rate ($R_{video}$) 34 equals the allocable data rate (R) 24 However during image transmission ($T_i$), the video data rate ($R_{video}$) 34 decreases by a rate equal to the image data rate ($R_{image}$) and the video distortion (D) increases. For the three element multi-media session illustrated in FIG. 2, the video distortion is a function of the difference between the allocable data rate (R) 24 and the image data rate ($R_{image}$) 30 where the image data rate varies from zero to $R_{image}$.

The present inventor concluded that an optimal allocation of a limited channel bandwidth would result from the minimization of a cost function that relates the distortion of at least one variable data rate element, such as video, and the delay in transfer or latency of the transmission of another element, such as an image, and which accommodates characteristics of the various media of the multimedia session. A cost function evaluates a particular solution to a problem to determine how well it solves the problem. The lower the value of the cost function, the better the solution.

For the exemplary multi-media session of FIG. 2 comprising two push sources (video and audio) and one pull source (image), two exemplary cost functions relating video distortion and image latency are:

$$C_1=D*T_i+K_1T_i$$

$$C_2=D+K_2T_i$$

where: $C_1$=cost (first cost function)

$C_2$=cost (second cost function)

D=video distortion where D is function of $(R-R_{image})$ $K_1$=a fairness criterion $K_2$=a fairness criterion $T_i$=image transmission time or latency=$(R_{image} * n_i$ bits)

In the first cost function, the video distortion is multiplied by the latency, $T_i$, to recognize that distortion has one value during the image transmission period while the video encoder rate equals the difference between the allocable data rate and the image data rate $(R-R_{image})$ and a second lesser distortion value for the period between transmission of images when the video encoder rate increases to the allocable data rate (R) 24. Minimization of either cost function will produce an image transmission rate $(R_{image})$ that minimizes the conflict between the goals of minimizing the transmission time or latency for the image $(T_i)$ and minimizing the video distortion resulting from the reduced video encoding rate during the period of image latency. The relative contributions to the cost function of each of the terms is established by a fairness criterion ($K_1$ or $K_2$ in the exemplary cost functions). The fairness criteria permit weighting to be assigned to the terms of the cost function expressing a relative priority of video distortion and image latency. Appropriate weighting may be based on a priority specific to an application.

An expression for the rate-distortion function for the video encoder is required to obtain an analytical solution to a cost function for a network session. The rate distortion function typically expresses average distortion for exemplary video sequences when encoded at differing rates. For example, a distortion function for an exemplary H.263+ compliant video encoder conforming to the TMN 10 reference model is as follows:

$$D = \frac{P_2 Q^2 F}{12N(R_C - P_1 F)}$$

where: D=distortion

N=total number of macroblocks in a video frame $R_c$=video encoding rate in bits per second ($R_c=R_{video}$ for the three element multi-media session)

F=frame rate $P_2$ and $P_1$ are constants related to the total number of bits in a frame Q=a video sequence type function The video sequence type function (Q) has a value specific to the type of video sequence being encoded. The video sequence type function can be considered to be a constant for a specific type of video sequence or may updated after each frame to reflect a type function for a portion of the video sequence. If an analytical expression for the rate-distortion function is not available for an encoder, curve fitting can be used to determine an appropriate function.

An analytical solution is obtained for the exemplary cost functions for a three element multimedia session such as that illustrated in FIG. 2 by setting the derivative of the cost function, with respect to $R_{image}$, equal to zero and solving the resulting quadratic equations. Solutions for the exemplary cost functions are:

For $C_1$: $R_{image} = \dfrac{(P_3 + K_1(R-P_4)) \pm (P_3^2 + P_3 K_1(R-P_4))^{1/2}}{K_1}$ For $C_2$: $R_{image} = (R-P_4)\dfrac{K_2 n_i \pm (P_3 K_2 n_i)^{1/2}}{K_2 n_i - P_3}$ where: $R_{image}$=image data transmission rate R=allocable bandwidth=$(R_{total}-R_{audio})$ $K_1$ and $K_2$=fairness criteria $$P_3 = \frac{P_2 Q^2 F}{12N}$$

$P_4 = P_1 F$ where: F=frame rate $n_i$ =bits per image

N=total number of macroblocks in a video frame

Q=video sequence type function

With the image transmission rate determined the video rate ($R_{video}$) can be determined by subtraction. The cost function $C_1$ provides a solution that is independent of the number of bits ($n_i$) in the image. However, since the server is aware of the number of bits in the image the second cost function ($C_2$) can be used in the alternative method of allocating bandwidth. If the images are supplied by a server other than the media server, an external mechanism can be used to advise the media server of the number of bits in the image.

For a multimedia session comprising a set of M continuous media push sources $\{m_1, m_2, \ldots, m_m\}$ and a single pull source I producing discrete transmission events occurring at times $\{t_1, t_2, \ldots, t_s\}$ a cost function can be written as follows:

$$C = \sum_{j=1}^{M} K_j D(R_j) + K D_1\left(R - \sum_{k=1}^{M} R_k\right)$$

where:

$D(R_j)$=distortion of push source $m_j$ as a function of the transmission rate $R_j$ for source $K_j$=a weighting factor expressing a priority for the source $m_j$ $D_I$=a delay distortion for the pull source as a function of available transmission rate (r) for the source where:

r=$(R-\Sigma R_k)$—the allocable bandwidth less the sum of the rates for all push sources K=is a weighting factor denoting the relative priority of the pull source Cost minimization is obtained by setting the derivatives of the cost function with respect to the rate of each source equal to zero:

$$\frac{dC}{dR_1} = 0, \frac{dC}{dR_2} = 0, \ldots, \frac{dC}{dR_M} = 0$$

leading to the following:

$$\frac{K_j dD(R_j)}{dR_j} + \frac{K D_1\left(R - \sum_{k=1}^{M} R_K\right)}{dR_j} = 0$$

for $j = \{1, 2, \ldots, M\}$

Minimization of a cost function provides a mechanism for allocating the limited bandwidth of a communication channel to several media or elements obtained from push or pull sources on the basis of the relative impacts on the media of reduced data rates for each of the media.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of allocating a channel bandwidth to data for a plurality of media comprising the steps of:
   (a) determining a distortion of a first medium as a function of a first data transfer rate;
   (b) determining a delay of a second medium as a function of a second data transfer rate; and
   (c) determining at least one of said first and said second data transfer rates that will minimize a cost function relating said distortion of said first medium and said delay of said second medium.

2. The method of claim 1 wherein said cost function further relates a relative priority of said first and said second data transfer rates.

3. The method of claim 1 wherein said first medium is a push medium and said second medium is at least one of a pull medium.

4. The method of claim 1 wherein said first data transfer rate is controlled by a first computer and said second data transfer rate is controlled by a second computer.

5. The method of claim 1 wherein:
   (a) said first medium is transferred with a protocol providing unreliable delivery; and
   (b) said second medium is transferred with a protocol providing reliable delivery.

6. A method of allocating a communication channel bandwidth to data for a plurality of media comprising the steps of:
   (a) reducing said bandwidth by a sum of all data rates for media having fixed data rates;
   (b) determining a distortion of at least one variable data rate medium as a function of said variable data rate;
   (c) determining a delay for at least one delayed medium as a function of a delayed medium data rate; and
   (d) determining at least one of said variable data rate and said delayed medium data rate that will minimize a cost function relating said distortion of said variable data rate medium and said delay of said delayed medium.

7. The method of claim 6 wherein said variable data rate medium is a push medium.

8. The method of claim 6 wherein said at least one delayed medium is pull medium.

9. The method of claim 6 wherein said cost function further comprises at least one priority factor relating a relative priority of a medium.

10. The method of claim 10 wherein said at least one variable data rate is controlled by a first computer and said at least one delayed medium data rate is controlled by a second computer.

11. A method of allocating a communication channel bandwidth to data for a plurality of media comprising the steps of:
   (a) reducing said bandwidth by a sum of all data rates for media having fixed data rates;
   (b) determining a distortion of at least one variable data rate medium as a function of a variable encoding rate established by a first computer;
   (c) determining a delay for at least one delayed medium as a function of a delayed medium data rate controlled by a second computer;
   (d) assigning a fairness criterion expressing a relative priority of said variable data rate medium and said delayed medium and
   (e) determining at least one of said variable encoding rate and said delayed medium data rate that will minimize a cost function relating said distortion of said variable data rate medium, said fairness criterion, and said delay of said delayed medium.

12. The method of claim 11 wherein said at least one variable data medium is transferred with a protocol providing unreliable delivery.

13. The method of claim 11 wherein said at least one variable data medium is transferred using a Real Time Transport Protocol.

14. The method of claim 12 wherein said protocol providing unreliable delivery is a User Datagram Protocol.

15. The method of claim 11 wherein said delayed medium is transferred by a protocol providing reliable delivery.

16. The method of claim 15 wherein said protocol providing reliable delivery is a Hypertext Transport Protocol.

* * * * *

UNITED STATES PATENT AND TRADEMARK OFFICE
CERTIFICATE OF CORRECTION

PATENT NO. : 6,731,605 B1
DATED : May 4, 2004
INVENTOR(S) : Sachin G. Deshpande

It is certified that error appears in the above-identified patent and that said Letters Patent is hereby corrected as shown below:

Column 6,
Line 30, change "$$C = \sum_{j=1}^{M} K_j D(R_j) + KD_1 \left( R - \sum_{k-1}^{M} R_k \right)$$" to -- $$C = \sum_{j=1}^{M} K_j D(R_j) + KD_I \left( R - \sum_{k-1}^{M} R_k \right)$$ --.

Line 55, change "$$\frac{K_j dD(R_j)}{dR_j} + \frac{KD_1 \left( R - \sum_{k=1}^{M} R_K \right)}{dR_j} = 0$$" to -- $$\frac{K_j dD(R_j)}{dR_j} + \frac{KD_I \left( R - \sum_{k=1}^{M} R_K \right)}{dR_j} = 0$$ --.

Signed and Sealed this

Ninth Day of May, 2006

JON W. DUDAS
*Director of the United States Patent and Trademark Office*